United States Patent
Kalhan et al.

(10) Patent No.: US 11,632,770 B2
(45) Date of Patent: *Apr. 18, 2023

(54) COOPERATIVE DISTRIBUTED SCHEDULING FOR DEVICE-TO-DEVICE (D2D) COMMUNICATION

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,923

(22) Filed: Oct. 29, 2021

(65) Prior Publication Data

US 2022/0061064 A1    Feb. 24, 2022

Related U.S. Application Data

(63) Continuation of application No. 15/512,948, filed as application No. PCT/US2015/052188 on Sep. 25, 2015, now Pat. No. 11,212,819.

(Continued)

(51) Int. Cl.
*H04W 72/12* (2009.01)
*H04W 72/08* (2009.01)
(Continued)

(52) U.S. Cl.
CPC ....... *H04W 72/1226* (2013.01); *H04L 47/266* (2013.01); *H04W 28/021* (2013.01); *H04W 28/0268* (2013.01); *H04W 28/16* (2013.01); *H04W 72/08* (2013.01); *H04W 72/1236* (2013.01); *H04W 72/1263* (2013.01);
(Continued)

(58) Field of Classification Search
CPC . H04W 76/14; H04W 24/10; H04W 28/0221; H04W 28/06; H04W 72/1289; H04W 88/02
See application file for complete search history.

(56) References Cited

U.S. PATENT DOCUMENTS

2011/0306349 A1    12/2011  Hakola et al.
2011/0312331 A1*   12/2011  Hakola ............... H04W 72/085
                                              455/452.2

(Continued)

OTHER PUBLICATIONS

ZTE; "SA and Data Resource Selection for D2D Communication Mode 2"; R1-143138; 3GPP TSG-RAN WG1 Meeting #78; Aug. 18-22, 2014; Dresden, Germany.

(Continued)

*Primary Examiner* — Romani Ohri

(57) ABSTRACT

In a communication system having a plurality of user equipment (UE) devices that are operating in a contention based mode for device-to-device (D2D) communication, each UE device transmits a preferred transmission indicator when a condition for preferred transmission is met at the UE device. If a UE device receives a preferred transmission indicator, the UE device delays transmission of a D2D scheduling assignment (SA) to contend for communication resources for D2D communication. The length of the delay can be based on a number of preferred transmission indicators that are received. The preferred transmission indicator is based on a buffer size in one example.

9 Claims, 3 Drawing Sheets

Related U.S. Application Data

(60) Provisional application No. 62/056,009, filed on Sep. 26, 2014.

(51) Int. Cl.

| | | |
|---|---|---|
| *H04W 76/14* | (2018.01) | |
| *H04W 74/08* | (2009.01) | |
| *H04W 28/02* | (2009.01) | |
| *H04L 47/26* | (2022.01) | |
| *H04W 72/1263* | (2023.01) | |
| *H04W 28/16* | (2009.01) | |
| *H04W 92/18* | (2009.01) | |
| *H04W 88/02* | (2009.01) | |

(52) U.S. Cl.
CPC ....... *H04W 74/0816* (2013.01); *H04W 76/14* (2018.02); *H04W 72/1289* (2013.01); *H04W 88/02* (2013.01); *H04W 92/18* (2013.01)

(56) References Cited

U.S. PATENT DOCUMENTS

| | | | |
|---|---|---|---|
| 2013/0155962 A1 | 6/2013 | Hakola et al. | |
| 2013/0157679 A1* | 6/2013 | Van Phan | H04W 76/14 |
| | | | 455/452.2 |
| 2013/0322413 A1 | 12/2013 | Pelletier et al. | |
| 2014/0094183 A1 | 4/2014 | Gao et al. | |
| 2014/0160950 A1 | 6/2014 | Vasudevan et al. | |
| 2014/0254523 A1* | 9/2014 | Chai | H04W 76/14 |
| | | | 370/329 |
| 2014/0269352 A1* | 9/2014 | Sun | H04W 72/1284 |
| | | | 370/250 |
| 2015/0103767 A1* | 4/2015 | Kim | H04W 74/06 |
| | | | 370/329 |
| 2016/0057785 A1 | 2/2016 | Zhang et al. | |
| 2016/0143078 A1 | 5/2016 | Jeong | |
| 2016/0157185 A1 | 6/2016 | Chae et al. | |
| 2016/0183276 A1* | 6/2016 | Marinier | H04W 72/02 |
| | | | 370/329 |
| 2016/0234702 A1 | 8/2016 | Heo et al. | |
| 2017/0127473 A1 | 5/2017 | Virtej et al. | |
| 2017/0171837 A1* | 6/2017 | Chen | H04W 72/04 |
| 2017/0188404 A1* | 6/2017 | Fodor | H04W 76/14 |
| 2017/0231007 A1 | 8/2017 | Yang et al. | |
| 2017/0303240 A1 | 10/2017 | Basu Mallick et al. | |

OTHER PUBLICATIONS

Huawei et al.; "Mode 2 resource allocation for D2D"; R1-142839; 3GPP TSG-RAN WG1 Meeting #78; Aug. 18-22, 2014; Dresden, Germany.

Huawei et al.; "1-bit resource reservation for mode 2 communication"; R1-143446; 3GPP TSG-RAN WG1 Meeting #78; Aug. 18-22, 2014; Dresden, Germany.

* cited by examiner

COOPERATIVE DISTRIBUTED SCHEDULING FOR DEVICE-TO-DEVICE (D2D) COMMUNICATION

CLAIM OF PRIORITY

The present application is a continuation of and claims priority to U.S. application Ser. No. 15/512,948, entitled "COOPERATIVE DISTRIBUTED SCHEDULING FOR DEVICE-TO-DEVICE (D2D) COMMUNICATION" and filed on Mar. 21, 2017, which is a national stage application of PCT/US2015/052188, entitled "COOPERATIVE DISTRIBUTED SCHEDULING FOR DEVICE-TO-DEVICE (D2D) COMMUNICATION" and filed on Sep. 25, 2015, which claims priority to Provisional Application No. 62/056,009 entitled "Cooperative Distributed Scheduling for Mode 2 Network-assisted D2D," filed Sep. 26, 2014, all assigned to the assignee hereof and hereby expressly incorporated by reference in their entirety.

FIELD

This invention generally relates to wireless communications and more particularly to cooperative distributed scheduling for device-to-device (D2D) communication between user equipment (UE) devices.

BACKGROUND

Many wireless communication systems use base stations to provide geographical service areas where wireless communication user equipment (UE) devices communicate with the base station (evolved Node B, eNB) providing the particular geographical service area in which the wireless communication UE devices are located. The base stations are connected within a network allowing communication links to be made between the wireless communication devices and other devices. In some situations, the communication links may be between UE devices within the service area of a base station. A cellular communication link between the UE devices includes communication through the base station providing the service. Where channel quality is sufficient, the UE devices can communicate directly through a device-to-device (D2D) communication link that does not include routing data through the base station.

In some situations, the D2D UE devices are assigned specific communication resources for D2D communication by an eNB. In some scenarios, the D2D UE devices select specific resources from a pool of allocated resources for the D2D communication. In some systems, the UE devices contend for the resources by randomly selecting resources from an allocated pool of resources and sending a control signal identifying the resources that will be used. If more than one UE device selects the same resource, a collision occurs and the UE devices again attempt to select resources for D2D communication. As the number of UE devices in a geographic area increases, the chances for collisions increases.

SUMMARY

In a communication system having a plurality of user equipment (UE) devices that are operating in a contention based mode for device-to-device (D2D) communication, each UE device transmits a preferred transmission indicator when a condition for preferred transmission is met at the UE device. If a UE device receives a preferred transmission indicator, the UE device delays transmission of a D2D scheduling assignment (SA) to contend for communication resources for D2D communication. The length of the delay can be based on a number of preferred transmission indicators that are received. The preferred transmission indicator is based on a buffer size in one example.

DETAILED DESCRIPTION

Figure 1:
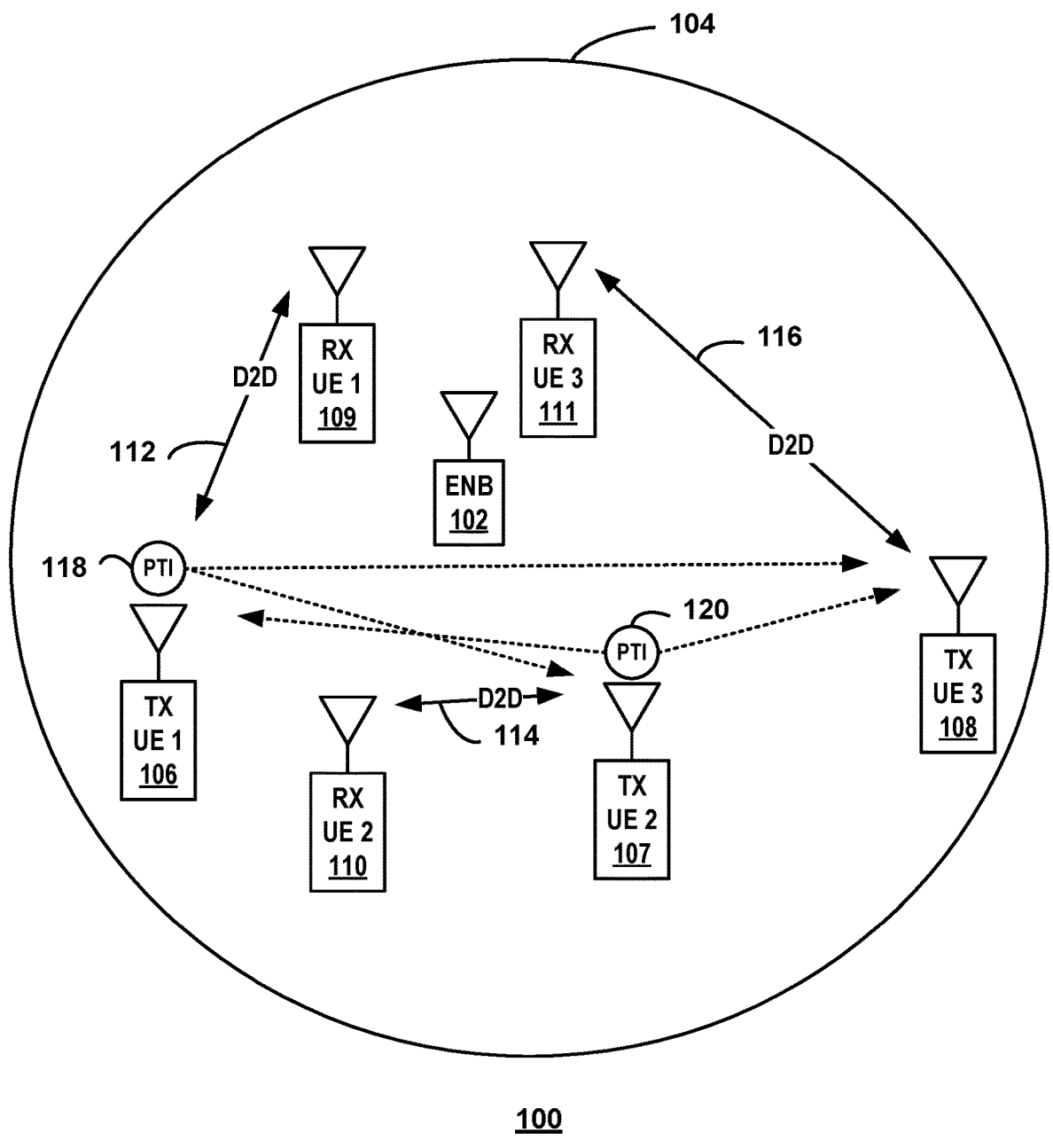
FIG. 1 is a block diagram of cellular communication system that supports device-to-device (D2D) communication where a user equipment (UE) device transmits a preferred transmission indicator when a condition is met while operating in a resource contention mode and other UE devices, in response to receipt of the preferred transmission indicator, refrain from transmitting a scheduling assignment (SA) that contends for D2D resources.

FIG. 1 is a block diagram of cellular communication system 100 that supports device-to-device (D2D) communication where a user equipment (UE) device transmits a preferred transmission indicator when a condition is met while operating in a resource contention mode and other UE devices, in response to receipt of the preferred transmission indicator, refrain from transmitting a scheduling assignment (SA) that contends for D2D resources. Although for the example of FIG. 1 the UE devices receiving a preferred transmission indicator (PTI) refrain from transmitting the SA, a UE device receiving a PTI may transmit the SA without delay. Criteria can be established that allow UE devices to continue contention for resources without delay in a conventional manner regardless of receipt of a PTI. In other words, the PTI is a request that may or may not be honored by UE devices receiving the PTI in some situations.

A base station (eNB) 102 provides wireless communication services to wireless communication user equipment (UE) devices within the geographical service area 104, sometimes referred to as a cell. Several base stations are typically interconnected through a backhaul (not shown) to provide several service areas to cover large areas. Other system components forming system entities and performing system functions such as Mobility Management Entity (MME), scheduling, gateway, and other functions are omitted from FIG. 1 in the interest of brevity and clarity. Any description with reference to FIG. 1 of the various functions and operations of such equipment may be implemented in any number of devices, circuits, or elements. Two or more functional blocks may be integrated in a single device, and the functions described as performed in any single device may be implemented over several devices in some circumstances. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and singlecarrier frequency-division multiple access (SC-FDMA) on the uplink. Although the techniques described herein may be applied in other types of communication systems, the exemplary systems discussed herein operate in accordance with at least one revision of the 3GPP LTE communication specification.

The base station (eNB) 102 is a fixed transceiver station, sometimes referred to as an evolved Node B, eNodeB or eNB, which may include a controller in some circumstances. The base station 102 may be connected to a controller through a backhaul which may include any combination of wired, optical, and/or wireless communication channels. The controller may include the functionality of the Mobility Management Entity (MME) and the Packet Gateway (P-GW) in a 3GPP LTE communication system.

Wireless (UE) communication devices (UE devices) 106-111 may be referred to as mobile devices, wireless devices, wireless communication devices, mobile wireless devices, user equipment, UEs, UE devices as well as by other terms. The UE devices 106-111 include electronics and code for communicating with base stations and with other wireless communication devices in D2D configurations. The UE devices may include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 102, 104. For example, a UE device may include a wireless modem connected to an appliance, computer, or television.

The base station 102 includes a wireless transceiver that exchanges wireless signals with the UE devices when the UE device is within the coverage area. Transmissions from the base stations and from the UE devices 106-111 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

For the example of FIG. 1, each of three UE devices 106, 107, 108 has data to transmit over a D2D link to another UE device 109, 110, 111. Although the UE devices may be within the coverage area, typically the UE devices are outside the coverage area when using the operating in Mode 2 to acquire D2D resources. Each D2D communication link 112, 114, 116 is a direct wireless communication link between a UE device and at least one other UE device that does not route data through the base station (eNB). For the example, all of the UE devices are operating in a resource contention mode for acquiring communication resources where each D2D UE device requiring communication resources for D2D transmission transmits a scheduling assignment (SA) message indicating the communication resources that it has selected for D2D transmission. An example of a resource contention mode is the Mode 2 used in systems operating in accordance with one or more revisions of the 3GPP LTE communication standard. In conventional systems using a resource contention mode, a collision may occur when multiple UE devices select the same communication resources and attempt to acquire those resources by indentifying them in an SA.

For the examples herein, however, collisions are avoided, or at least minimized, by using a Cooperative Distributed Scheduling (CDS) technique where a preferred transmission indicator (PTI) 118, 120 is transmitted from a UE device 106, 107 having data to transmit when a condition is met at the UE device. As discussed below, the condition may at least partially be related to the buffer size at the UE device. UE devices receiving the preferred transmission indicator delay transmission of their SA and data in response to receiving the preferred transmission indicator. The determination whether to delay and the length of the delay may be based on factors such as the number of received preferred transmission indicators and conditions at the UE device such as buffer size, required Quality of Service (QoS), and other factors.

Continuing with the example of FIG. 1, a first transmitting UE device 106, a second transmitting UE device 107, and a third transmitting UE device 108 have data to transmit over a D2D communication link 112, 114, 116 to a first receiving UE device 109, a second receiving UE device 110 and a third receiving UE device 111, respectively. All three transmitting UE devices, therefore, have a buffer with some data. Although the example includes one to one device communications, the D2D communication may include D2D groups including more than two UE devices in some situations. The first transmitting UE device 106 and the second transmitting UE device transmit preferred transmission indicators 118, 120 that are received by all of the transmitting UE devices in this example. Based on the conditions at the UE device and received preferred transmission indicators, each transmitting UE device determines a transmission schedule.

In one example discussed in more detail with reference to FIG. 4, the UE device determines the transmission schedule based its current buffer size, the number of received preferred transmission indicators, and whether the next D2D transmission will reduce the buffer size below a threshold. For the example, each UE device transmits a single bit flag as a preferred transmission indicator when its buffer size is above a threshold and it will not be reduced below the threshold after the next transmission. The one bit flag is transmitted in the scheduling assignment (SA) and received by the other UE devices. The flag has one of two values where an active value (e.g., bit set to 1) indicates the preferred transmission indication. Each UE device determines the number of received active value flags and refrains from transmitting the next SA based on the number of active value flags and its transmission buffer size.

In some situations, the preferred transmission indicator 118, 120 is based on the priority of the D2D call. For example, in public safety and emergency situations, a UE device may transmit the preferred transmission indicator even if the buffered data is below the threshold. The system can be configured such that other UE devices not involved in public safety stop transmitting until the transmission preference indictor is no longer being transmitted as active.

In some circumstances, the preferred transmission indicator may be based on the QoS of the transmission. For example, where the UE device is transmitting latency intolerant data such as real time voice and/or video, the UE device can transmit an active preferred transmission indicator to increase the chances of obtaining the required communication resources.

Figure 4:
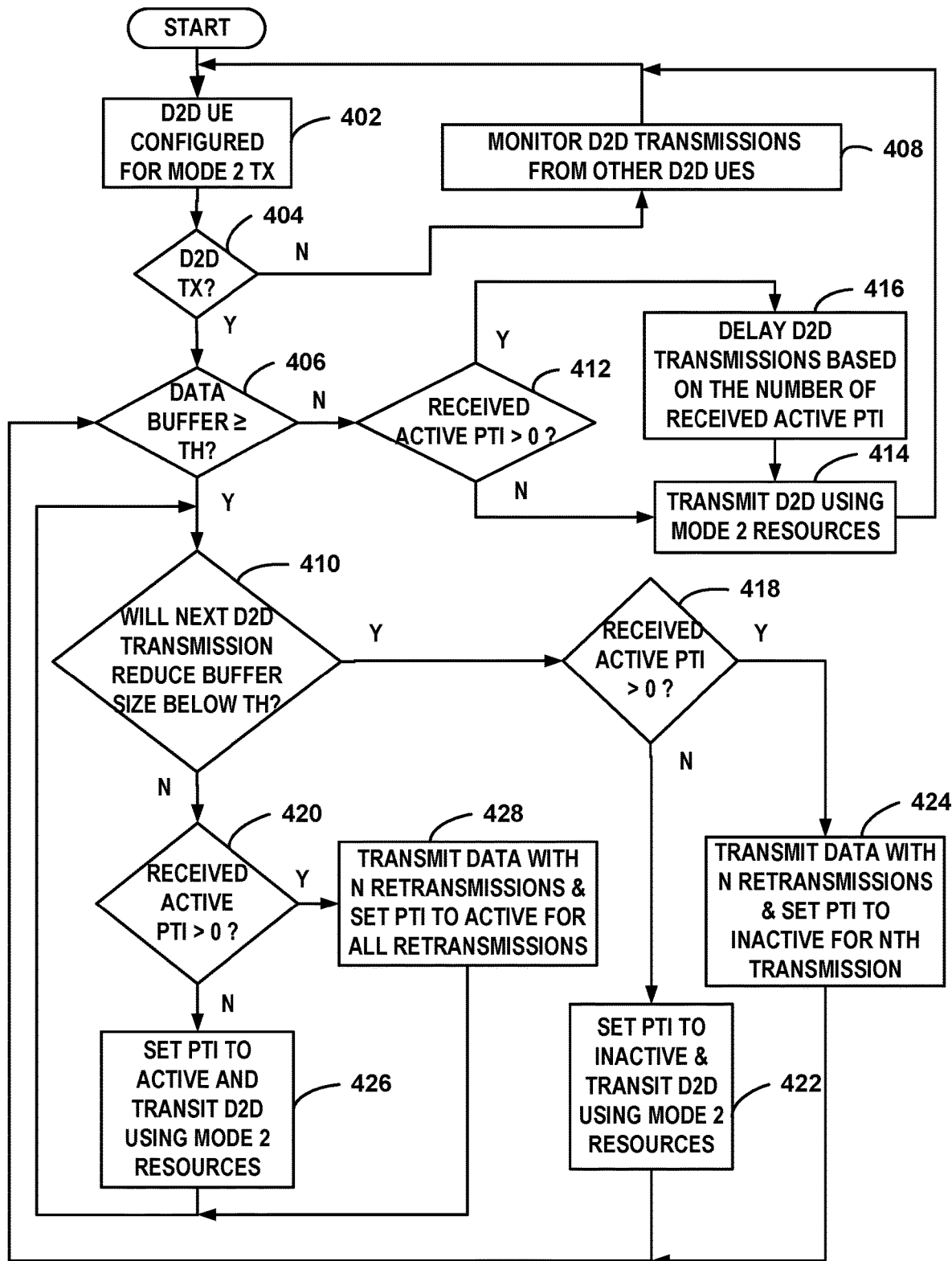
FIG. 4 is a flowchart of an example of a method of managing cooperative distributed scheduling for device-to-device (D2D) communication.

Although a one bit flag is used for the example of FIG. 4, the flag may include more than one bit. Such an indicator may be useful where the indicator is based on multiple conditions. For example, if a preferred transmission indicator is based on the buffer size, QoS and public safety criteria, a two bit flag can indicate no active flag (e.g., value=00), low level transmission preference (e.g., value=01), medium level transmission preference (e.g., value=10) or a high level transmission preference (e.g., value=11). The low level transmission preference may be transmitted when the buffer size is exceeded and the medium level transmission preference may be transmitted when a high QoS is required. The high level transmission preference may be transmitted for public safety situations. Based on the flag value, other UE devices may delay transmissions or refrain from transmitting until the flag value decreases. A variety of combinations of thresholds and criteria can be applied to determine whether the UE device refrains from transmitting and the length of the transmission delay.

Figure 2:
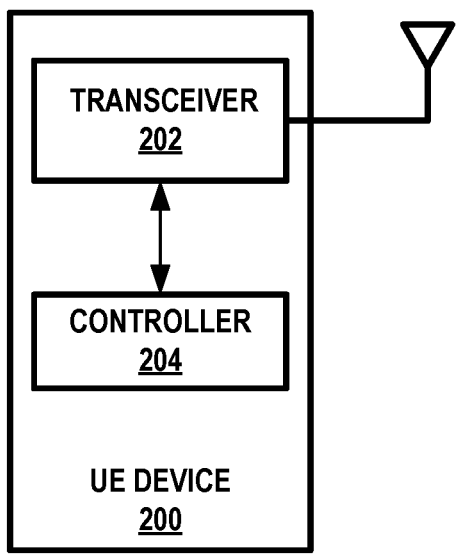
FIG. 2 is a block diagram of an example of a UE device suitable for use as one of the UE devices in FIG. 1.

FIG. 2 is a block diagram of an example of a UE device 200 suitable for use as one of the UE devices 106-111 in FIG. 1. The UE device 200 includes a transceiver 202 and a controller 204, as well as other components and circuitry (not shown) such as memory and a user interface, for example.

The transceiver 202 includes a transmitter that transmits uplink wireless signals to base stations (eNBs) and a receiver that receives downlink wireless signals from base stations (eNBs) over the uplink and downlink channels, respectively. The transceiver 202 can also be configured to transmit and receive D2D signals using allocated cellular resources, such as uplink communication resources, for example. The controller 204 controls components of the UE device 200 to manage the functions of the device 200 described herein as well as to facilitate the overall functionality of the device 200. The controller 204 is connected to the transceiver 202 and other components such as memory.

Figure 3:
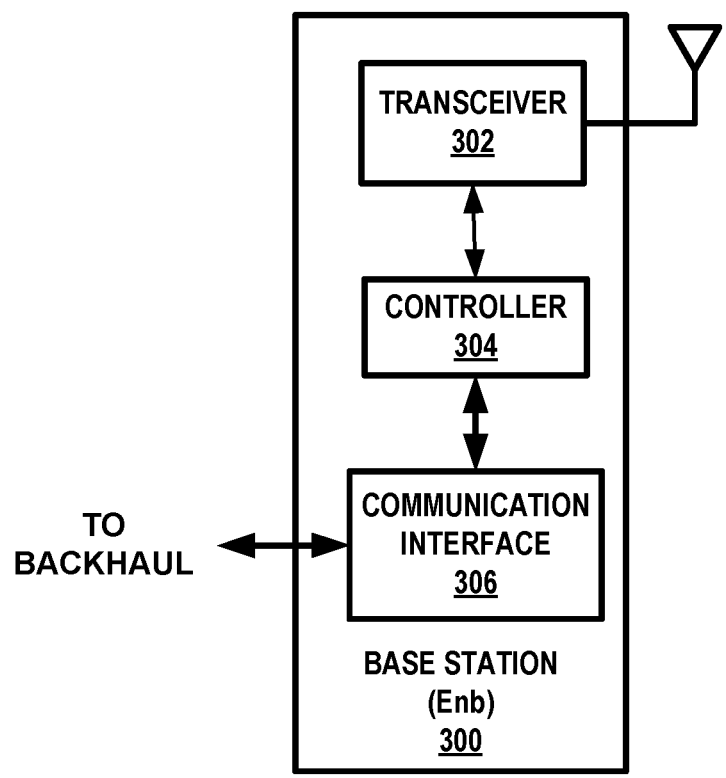
FIG. 3 is a block diagram of an example of a base station (eNB) suitable for use as the base station (eNB) in FIG. 1.

FIG. 3 is a block diagram of an example of a base station (eNB) 300 suitable for use as the base station (eNB) 108 in FIG. 1. The base station (eNB) 300 includes a transceiver 302, a controller 304, and a communication interface 306 as well as other components and circuitry (not shown) such as memory, for example.

The transceiver 302 exchanges wireless signals with the UE devices within the service area 106. Transmissions from the base station (eNB) and from the UE devices are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels.

The transceiver 302, therefore, includes at least a downlink transmitter for transmitting downlink signals and an uplink receiver for receiving uplink signals. The receiver and controller measure one or more parameters to determine characteristics of the uplink channels. An example of a suitable technique includes determining CSI for the channels.

For the example, the base station (eNB) 300 also includes a communication interface 306 for facilitating communication over the backhaul with other eNBs and network entities. Where X2 signaling is available, the communication interface 312 communicates over the backhaul using X2.

FIG. 4 is a flowchart of an example of a method of managing cooperative distributed scheduling for device-to-device (D2D) communication. For the examples herein, the method is performed by executing code on the controller and utilizing other components of a UE device 200. The steps of the method may be performed in a different order and some steps may be performed simultaneously in some situations.

At step 402, the UE device is configured for Mode 2 transmission. In accordance with conventional systems using Mode 2 transmission, there are two resource pools including one for transmission of SA and another for data transmissions. Each pool has a different periodicity and redundancy. For example there are two SA resource pools and four Data resource pools occurrences per period. The UE device transmits a data block within a period. There are 4 occurrences within the period to transmit the data block. The data block is divided into 4 sub-packets with the first sub-packet contains the source data sub-packet (systematic bits) and the other 3 contain the redundancy data sub-packets belonging to the data block. The same data block results in 4 different sub-packets due to encoding. Each UE device randomly selects a resource with the SA resource pool to transmit its SA. The same UE device selects another resource in the next SA resource pool to retransmit the SA. The same UE device then transmits data using four sub-packets by selecting four resources within each period. The data resources selected by the UE device are indicated (pointed) by the SA.

At step 404, it is determined whether the UE device will engage in D2D transmission. The UE device determines if there is data to transmit over a D2D communication link. If the UE device will transmit over D2D communication link, the procedure continues at step 406. Otherwise, the procedure proceeds to step 408 where the UE device monitors D2D transmissions from other D2D UE devices.

At step 406, it is determined whether the size of the data buffer for the D2D transmission is greater than or equal to a threshold. The threshold may be a pre-configured value or may be adjusted in some situations. If the buffer is greater than or equal to the threshold, the procedure continues at step 410. Otherwise, the procedure continues at step 412.

At step 412, it is determined whether the UE device has received any active preferred transmission indicators (PTIs). For the example of FIG. 4, the active PTI is one bit flag of "1" indicating that the UE device transmitting the flag has a preferred transmission. If the UE device has not received any PTIs, the procedure continues at step 414 where the UE device transmits D2D using Mode 2 resources. Otherwise, the procedure continues at step 416 where the UE device delays D2D transmission based on the number of active PTIs that have been received. For the example herein, the transmission of the SA and data are delayed by a number of periods equal to the number of active PTIs that were received by the UE device. The 3GPP specification defines a period for D2D communications and is referred to as Sidelink Period Communication or SL-PeriodComm. The period is configurable by the network and can have any of several lengths measured in subframes such as 40 subframes, 60 subframes, 70 subframes, 80 subframes, 120 subframes, 140 subframes, 160 subframes, 240 subframes, 280 subframes, and 320 subframes, for example. The PTI is set to inactive and the procedure returns to step 402 after the D2D transmission.

At step 410, it is determined whether the next D2D transmission will reduce the data buffer size below the threshold. If the next D2D transmission will reduce the buffer below the threshold, the procedure continues at step 418. Otherwise, the procedure continues at step 420.

A step 418, it is determined whether the UE device has received any active preferred transmission indicators (PTIs). If the UE device has not received any PTIs, the procedure continues at step 422. Otherwise, the procedure continues at step 424. At step 2.

At step 422, the UE device transmits D2D using Mode 2 resources and sets its PTI to inactive (e.g., flag of "0"). For the example, the UE device transmits an SA in the next period where the SA identifies the resources and includes the inactive PTI. The D2D data is then transmitted using the identified D2D resources and the procedure returns to step 406.

At step 424, the UE device transmits the D2D data in N retransmissions. For the example, the UE device transmits an SA and data in each subsequent period for N periods, where N is the number of active PTIs that were received. The SAs include an active PTI for all transmissions except the Nth retransmission where the PTI is set to inactive. As discussed herein, a retransmission may include a transmission of the identical block or it may include a new data block. For example, for VoIP scenarios, the UE device may drop the current packet and decide to transmit the next VoIP packet as the retransmission.

At step 420, it is determined whether the UE device has received any active preferred transmission indicators (PTIs). If the UE device has not received any PTIs, the procedure continues at step 426. Otherwise, the procedure continues at step 428.

At step 426, the UE device transmits D2D using Mode 2 resources and sets its PTI to active (e.g., flag of "1"). For the example, the UE device transmits an SA in the next period where the SA identifies the resources and includes the active PTI. The D2D data is then transmitted using the identified D2D resources and the procedure returns to step 406.

At step 428, the UE device transmits the D2D data in N retransmissions. For the example, the UE device transmits an SA and data in each subsequent period for N periods, where N is the number of active PTIs that were received. The SAs include an active PTI for all transmissions. Therefore, when it is determined that the next transmission will not reduce the buffer size below the threshold, the UE device retransmits the data for a number of retransmissions equal to the number of received active PTIs and includes an active PTI for all retransmissions. If, however, the next transmission will reduce the size of the buffer below the threshold, the UE device retransmits the data for a number of retransmissions equal to the number of received active PTIs and includes an active PTI for all retransmissions except the last.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    selecting, at a first user equipment (UE) device, a transmission preference level from a plurality of transmission preference levels, based on a Quality of Service (QoS) required by the first UE device for transmitting data over direct communication, the plurality of transmission preference levels including at least a low level, a medium level, and a high level; and
    transmitting, from the first UE device to a second UE device, a scheduling assignment (SA) message including an indicator indicating the selected transmission preference level.

2. The method of claim 1, wherein the indicator indicates the selected transmission preference level with a plurality of bits.

3. The method of claim 1, wherein the indicator indicates the selected transmission preference level with more than two bits.

4. A wireless communication user equipment (UE) device comprising:
    a controller configured to select a transmission preference level from a plurality of transmission preference levels, based on a Quality of Service (QoS) required by the first UE device for transmitting data over direct communication, the plurality of transmission preference levels including at least a low level, a medium level, and a high level; and
    a transmitter configured to transmit, to a second UE device, a scheduling assignment (SA) message including an indicator indicating the selected transmission preference level.

5. The wireless communication UE device of claim 4, wherein the indicator indicates the selected transmission preference level with a plurality of bits.

6. The wireless communication UE device of claim 4, wherein the indicator indicates the selected transmission preference level with more than two bits.

7. An apparatus for controlling a user equipment (UE) device, the apparatus comprising:
    a memory; and a processor, the processor configured to:
    select a transmission preference level from a plurality of transmission preference levels, based on a Quality of Service (QoS) required by a first UE device for transmitting data over direct communication, the plurality of transmission preference levels including at least a low level, a medium level, and a high level; and
    transmit, to a second UE device, a scheduling assignment (SA) message including an indicator indicating the selected transmission preference level.

8. The apparatus of claim 7, wherein the indicator indicates the selected transmission preference level with a plurality of bits.

9. The apparatus of claim 7, wherein the indicator indicates the selected transmission preference level with more than two bits.

* * * * *